United States Patent [19]

Inagaki et al.

[11] Patent Number: 4,984,497
[45] Date of Patent: Jan. 15, 1991

[54] TONE SIGNAL GENERATION DEVICE HAVING A TONE ELEMENT CONTROL FUNCTION

[75] Inventors: Yoshihiro Inagaki; Hideo Yamamoto; Tetsuo Nishimoto, all of Hamamatsu, Japan

[73] Assignee: Yamaha Corporation, Hamamatsu, Japan

[21] Appl. No.: 126,840

[22] Filed: Nov. 30, 1987

[30] Foreign Application Priority Data

Nov. 28, 1986 [JP] Japan ................. 61-283274
Nov. 28, 1986 [JP] Japan ................. 61-283275

[51] Int. Cl.$^5$ ................. G10H 7/00; G10H 1/02
[52] U.S. Cl. ................. 84/626; 84/602; 84/622; 84/627; 84/DIG. 2
[58] Field of Search ................. 84/1.01, 1.03, DIG. 2, 84/1.19, 1.24, 1.28, 601–603, 615, 617, 618, 622, 624, 625, 653, 655, 656, 659, 660, 626, 627; 340/825.5, 825.25, 365 R, 365 S; 307/231; 328/137

[56] References Cited

U.S. PATENT DOCUMENTS

| | | | |
|---|---|---|---|
| 4,214,500 | 7/1980 | Adachi et al. | 84/1.03 X |
| 4,235,142 | 11/1980 | Nakada et al. | 84/1.03 |
| 4,269,102 | 5/1981 | Kondo et al. | 340/365 S X |
| 4,275,634 | 6/1981 | Imamura et al. | 84/1.03 |
| 4,476,763 | 10/1984 | Uya et al. | 84/1.01 |
| 4,554,847 | 11/1985 | Nishimoto . | |
| 4,703,680 | 11/1987 | Wachi et al. | 84/DIG. 2 |

Primary Examiner—A. T. Grimley
Assistant Examiner—Matthew S. Smith
Attorney, Agent, or Firm—Spensley Horn Jubas & Lubitz

[57] ABSTRACT

Tone forming channels generate tone signals corresponding to tone pitch information assigned thereto with characteristics responsive to tone element control signals supplied thereto. An assignment order setting section selects desired channels and establishes an order of assignment of the selected channels. An assignment section sequentially changes, at each timing of generation of a tone, a channel to which a tone to be generated should be assigned in accordance with the established assignment order. In the channels whose assignment order has been established, tones whose tonal quality are different from one another are formed. A group setting section divides the tone forming channels into plural groups. The assignment section performs, group by group, assignment of a tone to be generated to any of channels in each group. Tones of different tonal quality are formed between different groups.

7 Claims, 10 Drawing Sheets

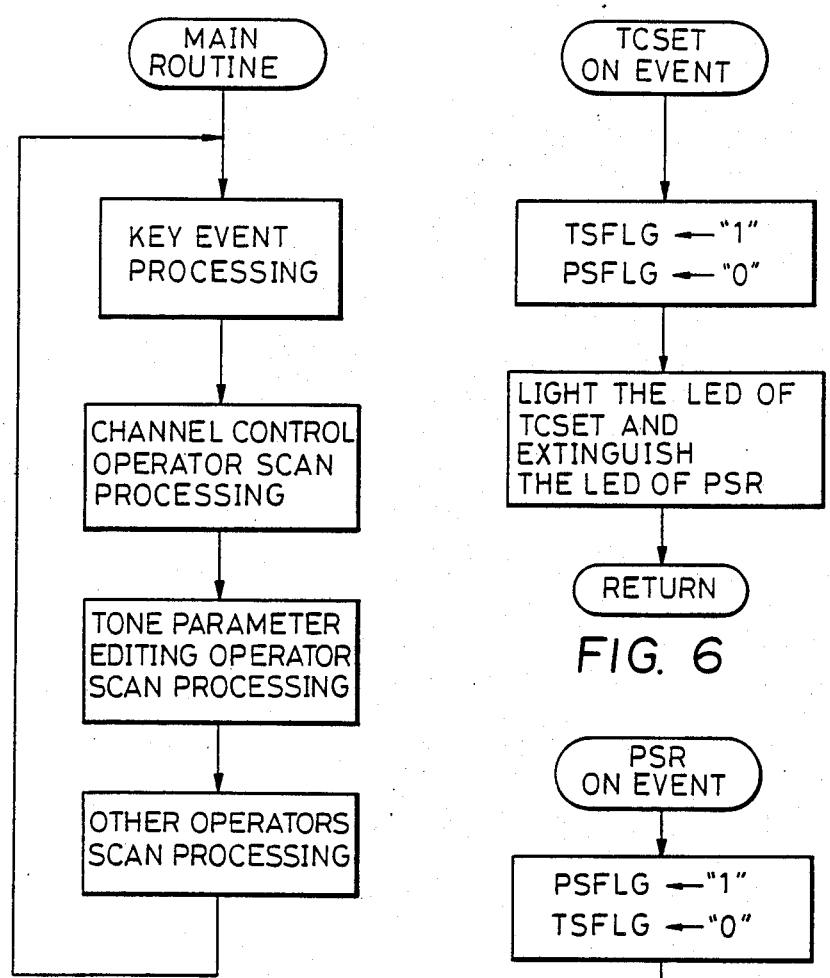
FIG. 5
FIG. 6
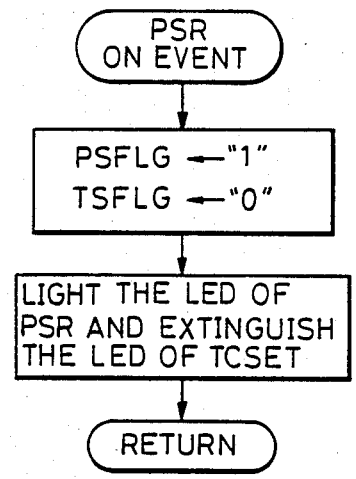
FIG. 7

TONE SIGNAL GENERATION DEVICE HAVING A TONE ELEMENT CONTROL FUNCTION

BACKGROUND OF THE INVENTION

This invention relates to a tone signal generation device used for an electronic musical instrument and other tone generation devices and, more particularly, to a tone signal generation device capable of changing tone elements such as tone color sequentially at each timing of generation of a tone.

This invention further relates to a tone signal generation device capable of generating a tone signal in channels in which tone elements such as tone color are different from one another.

U.S. Pat. No. 4,214,500 discloses a tone signal generation device in which tone elements such as pitch, tone color and tone envelope of a tone to be generated are changed randomly at each timing of generating the tone. In this prior art device, tone elements such as pitch, tone color and tone volume envelope of a tone to be generated are independently controlled in plural tone forming channels and sounding of tones of depressed keys is assigned in accordance with a normal tone generation assignment principle (i.e., tone generation is assigned to an empty channel if there is one whereas, if there is no such empty channel, it is assigned in accordance with truncating processing to a channel in which the oldest released key exists or in which attenuation of the tone has progressed to the furthest degree). Accordingly, relationship between the order of depression of keys (i.e., order of sounding of tones) and a channel to which tone generation is assigned is entirely random and, as a result, tone elements such as pitch, tone color and tone volume envelope of a tone to be generated change randomly at each timing of generation of a tone.

In the above described prior art device, pitch, tone color and tone volume envelope of a tone to be generated can be changed only randomly so that only a random performance effect can be obtained.

U.S. Pat. No. 4,387,617 discloses a device in which generation of a tone corresponding to one depressed key is assigned to channels which are different depending upon tone colors and plural tone signals corresponding to the same depressed key are thereby generated with different tone colors in different channels. If, for example, tone colors 1 and 2 have been selected and keys C4 and D4 have been depressed, the key C4 and the tone color 1 are assigned to channel 1, the key C4 and the tone color 2 are assigned to channel 2, the key D4 and the tone color 1 are assigned to channel 3 and the key D4 and the tone color 2 are assigned to channel 4. In this manner, tone generation is assigned to plural channels in correspondence to all combinations of selected number of tone colors and selected number of depressed keys.

When plural tone colors have been selected in the above described prior art device, tones of plural channels of the same number as the number of the tone colors are automatically generated and all tones of the depressed keys become automatically tones of plural channels. It was not possible in the prior art device to easily perform a complicated multi-channel control such as sounding tones of a part of depressed keys as multi-channel tones while sounding the rest of tones as a single channel tone and differing the number of channels between tones of a part of the depressed keys and the rest of tones.

SUMMARY OF THE INVENTION

It is therefore an object of the invention to provide a tone signal generation device which is capable of changing tone elements such as pitch, tone color and tone volume envelope of a tone to be generated sequentially at each timing of generation of the tone and thereby realizing a pleasant performance effect owing to the orderly change and also capable of setting this order as desired by the performer.

It is another object of the invention to provide a tone signal generation device which is capable of easily performing such complicated multi-channel control which could not be performed by the prior art devices.

The tone signal generation device according to the invention comprises tone forming channels each forming a tone signal of a tone pitch corresponding to assigned tone pitch information, assignment order setting means for setting an order of assignment with respect to plural channels among the tone forming channels, assignment means for changing and designating, at each timing for generating a tone, a channel to which the tone pitch information of the tone to be generated is to be assigned in order set by the assignment order setting means and assigning the tone pitch information to the designated channel, and tone element control means for supplying to the tone forming channels a tone element control signal controlling a tone element of the tone signal formed in the tone forming channels, supplying tone element control signals which are different from one another with respect at least to channels for which the order of assignment is set by the assignment order setting means.

The order of assignment is established by the assignment order setting means with respect to plural channels among tone forming channels CH1-CHn. The assignment means changes and designates, at a timing of generation of a tone, a channel to which the tone pitch information of the tone to be generated should be assigned in accordance with the order set by the assignment order setting means and assigns the tone pitch information to the designated channel. For example, if it has been established by the assignment order setting means that the assignment should be made in the order of channels CH1, CH2 and CH3, the channel to which the assignment should be made is changed from CH1, CH2 and CH3 at each tone generation timing in such a manner that the first tone is assigned to channel CH1, the second tone to channel CH2, the third tone to channel CH3 and the fourth tone to channel CH1.

In the tone forming channels CH1-CHn, tone signals of tone pitches corresponding to the tone pitch information assigned thereto are formed. Tone elements of tone signals formed in the respective tone forming channels are controlled by the tone element control signals supplied from the tone element control means. This tone element control means supplies tone element control signals which are different from one another with respect at least to the channels for which the assignment order is set by the assignment order setting means. The tone elements herein means elements which determine characteristics of the tone such as tone color, pitch and tone volume envelope. Accordingly, in plural channels in which the assignment order is established by the assignment order setting means, one or more of tone elements such as tone color, pitch and tone volume envelope formed in the respective channels differ between the respective channels. To these channels is supplied the tone pitch information of the tone to be generated sequentially at each tone generation timing in accordance with the established order of assignment. Accordingly, the tone elements such as pitch, tone color and tone volume envelope of the tone to be generated can be sequentially changed at each tone generation timing.

The tone signal generation device achieving the other object of the invention comprises tone forming channels each forming a tone signal of a tone pitch corresponding to assigned tone pitch information, group setting means for dividing the channels into groups each consisting of one or more channels, assignment means for assigning, with respect to each group set by the group setting means, tone pitch information of a tone to be generated to a channel in the group, and tone element control means for supplying to the tone forming channels a tone element control signal controlling a tone signal formed in the tone forming channels, supplying the tone element control signals which are different from one another at least between groups set by the group setting means.

The tone forming channels CH1-CHn are divided by the group setting means into plural groups each consisting of one or more channels. The assignment means assigns, with respect to each group set by the group setting means, tone pitch information of a tone to be generated to the channel or channels of the group. In the tone forming channels CH1-CHn, tone signals of tone pitches corresponding to the tone pitch information assigned to the respective channels are formed. The tone elements of the tones formed in the respective tone forming channels are controlled by tone element control signals supplied from the tone element control means. This tone element control means supplies the tone element control signals which are different from one another at least between the groups set by the group setting means. The tone elements herein mean elements which determine characteristics of a tone such as tone color, pitch and tone volume envelope. Accordingly, between the groups set by the group setting means, one or more of the tone elements such as tone color, pitch and tone volume envelope of tones formed in the channels belonging to the respective groups are made different from at least other groups.

By assigning, group by group, tone pitch information of a tone to be generated to channels in the group and differing one or more of tone elements such as tone color, pitch and tone volume envelope of the tone formed in the channel belonging to each group at least from other groups, tone signals based on the same tone pitch information are sounded simultaneously with different tone colors or characteristics whereby a multi-channel effect can be produced.

Preferred embodiments of the invention will now be described with reference to the accompanying drawings.

BRIEF DESCRIPTION OF THE DRAWINGS

In the accompanying drawings,

FIGS. 5 through 12 are flow charts showing respectively examples of processings executed by a microcomputer of FIG. 2.

DESCRIPTION OF PREFERRED EMBODIMENTS

Figure 1A:
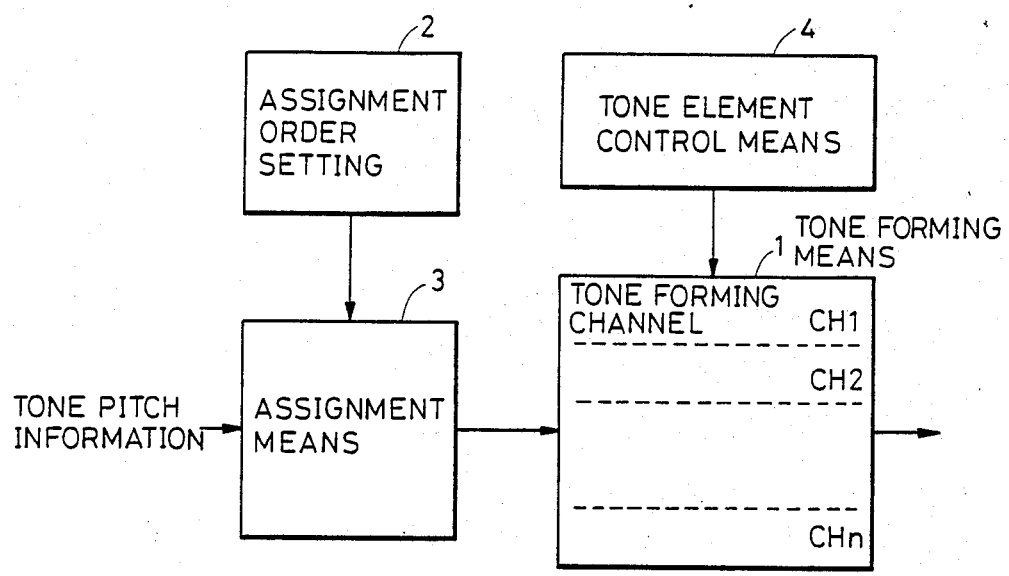
FIG. 1A is a block diagram showing functions of an embodiment of the invention.

In FIG. 1A, tone forming means 1 comprises tone forming channels CH1-CHn which produce tone signals of tone pitches corresponding to assigned tone pitch information. Assignment order setting means 2 sets the order of assignment with respect to desired channels among the tone forming channels CH1-CHn. Assignment means 3 changes and designates, at each timing of generation of a tone, a channel to which the tone pitch information of the tone to be generated should be assigned in accordance with the order set by the assignment order setting means 2 and assigns this tone pitch information to the designated channel. If, for example, it has been established by the assignment order setting means 2 as described above that the assignment should be made in the order of channels CH1, CH2 and CH3, the channel to which the tone pitch information should be assigned is changed at each tone generation timing in such a manner that the first tone is assigned to the channel CH1, the second tone to the channel CH2, the third tone to the channel CH3 and the fourth tone to the channel CH1.

In the tone forming channels CH1-CHn, tone signals of tone pitches corresponding to the tone pitch information assigned to the respective channels are formed. Tone elements of the tone signals formed in the respective tone forming channels are controlled by tone element control signals supplied by tone element control means 4. This tone element control means 4 supplies tone element control signals which are different from one another with respect at least to the channels for which the assignment order is set by the assignment order setting means 2. The "tone elements" herein means elements which determine characteristics of a tone such as tone color, pitch and tone volume envelope. Accordingly, in the channels for which the assignment order is set by the assignment order setting means 2, one or more of tone elements such as tone color, pitch and tone volume envelope of a tone to be generated formed in the respective channels are made different from one another. To these channels are assigned, at each tone generation timing, the tone pitch information of the tones to be generated in accordance with the set assignment order. Accordingly, the tone elements such as pitch, tone color and tone volume envelope of the tones to be generated can be changed sequentially at each tone generation timing.

Figure 1B:
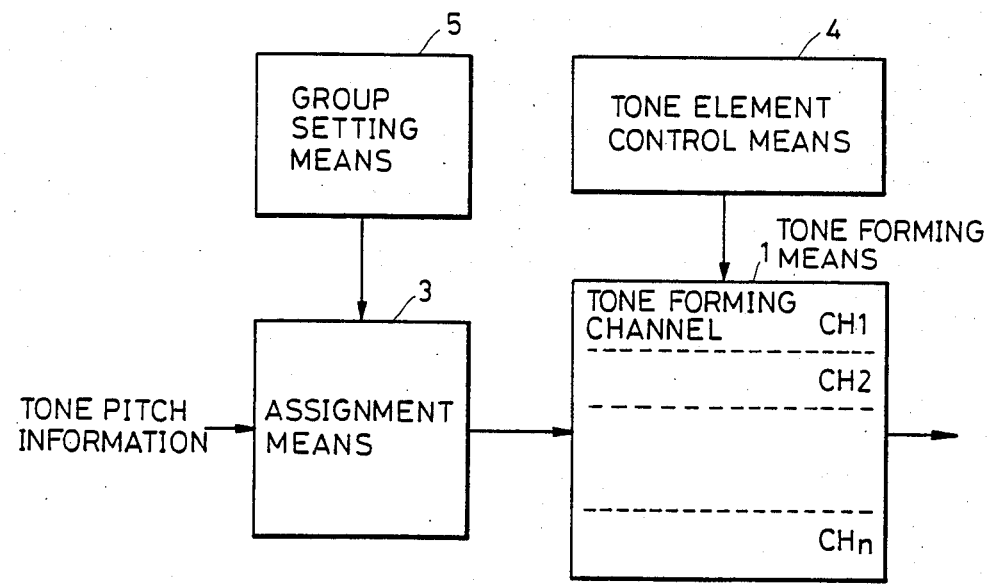
FIG. 1B is a block diagram showing functions of another embodiment of the invention.

In FIG. 1B, group setting means 5 is provided instead of the assignment order setting means 2 of FIG. 1A. The group setting means 5 divides the tone forming channels CH1-CHn into groups each consisting of one or more channels. Assignment means 3 assigns, with respect to each group set by the group setting means 5, tone pitch information of a tone to be generated to the channel or channels of the group. In the tone forming channels CH1–CHn, tone signals of tone pitches corresponding to the tone pitch information assigned to them are formed. Tone elements of the tones generated by the tone forming channels are controlled by tone element control signals supplied from tone element control means 4. This tone element control means 4 supplies the tone element control signals which are different from one another at least between the groups set by the group setting means 5. Accordingly, between the groups set by the group setting means 5, one or more of tone elements such as tone color, pitch and tone volume envelope of the tones formed in the channels belonging to the respective groups are made different from at least the other groups.

By assigning, group by group, tone pitch information of the tone to be generated to the channel or channels in each group and differing one or more tone elements such as tone color, pitch and tone volume envelope of the tones formed in the channels belonging to each group at least from the other group, tone signals based on the same tone pitch information are simultaneously produced with different tone colors or characteristics whereby a multi-channel effect can be realized.

The group setting by the group setting means 5 may be made entirely freely. Assuming that the channel number is 8, if, for example, the setting is made in such a manner that channels CH1, CH2 and CH3 are combined in the first group, channels CH4 and CH5 are combined in the second group and channels CH6, CH7 and CH8 are combined in the third group, the same three tones are assigned to the first and second groups but two tones out of three tones only are assigned to the second group. Accordingly, tone signals corresponding to the two keys out of the three depressed keys are generated in three channels but the tone signal corresponding to the remaining one key is generated in only two channels. Depending upon the manner of group setting by the group setting means 5, various manners of multi-channel control besides the above described example can be realized.

Figure 2:
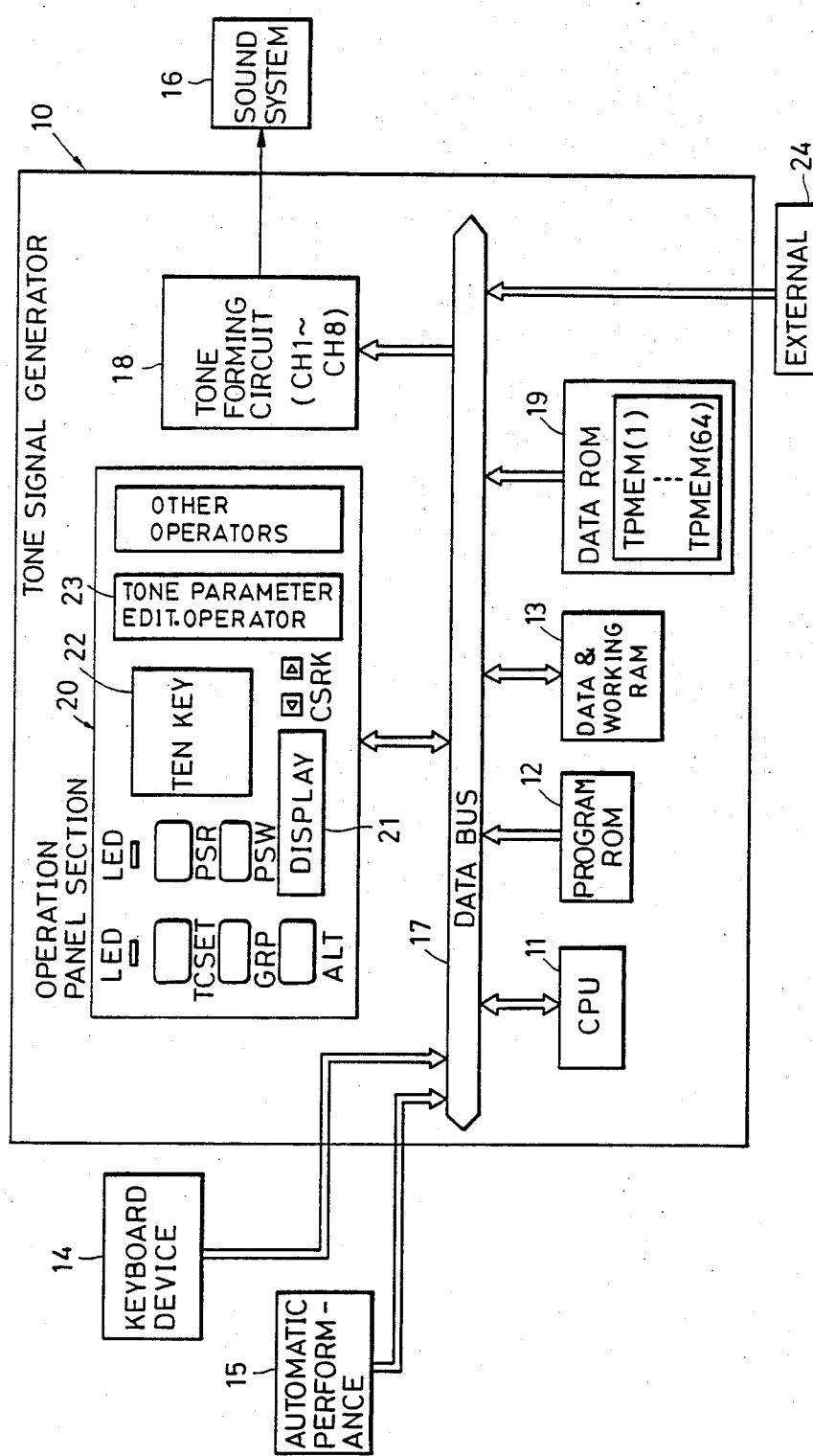
FIG. 2 is a block diagram showing a hardware construction of an embodiment of the tone signal generation device according to the invention.

FIG. 2 is a hardware construction of an embodiment of a tone signal generator 10 according to the invention. In the tone signal generator 10, various operations and processings are controlled by a microcomputer comprising a CPU (central processing unit) 11, a program ROM (read-only memory) 12 and a data and working RAM (random-access memory) 13. The tone signal generator 10 of this embodiment is moduled in the form of a tone source module. To this tone source module are connected a moduled keyboard device 14 and moduled automatic performance device 15 and further connected a sound system 16 whereby an electronic musical instrument is constructed.

The moduled keyboard 14 comprises a keyboard having a plurality of keys and a circuit for detecting depression and release of a key in this keyboard. Each time a key-on event (new depression of a key) or key-off event (new release of a key) occurs, a key code of a key which ;has been newly depressed or released and a key-on event signal or key-off event signal is produced. The moduled automatic performance device 15 produces key data including a key code representing tone pitch of an automatic performance tone at a timing at which the automatic performance tone should be generated. Data produced by these moduled keyboard device 14 and automatic performance device 15 are represented in MIDI scale which is a common scale for processing a tone signal and applied to the microcomputer through a data bus 17 in the tone signal generator 10.

The tone signal generator 10 comprises a tone forming circuit 18 having plural tone forming channels (it is assumed that this embodiment has 8 channels from CH1 to CH8). The tone signal generator 10 receives key data including a key code representing tone pitch of a tone to be generated from the keyboard device 14 or the automatic performance device 15, assigns generation of a tone corresponding to the received key code to a channel in the tone forming circuit 18 in accordance with a predetermined assignment condition, and generates a tone signal in the respective tone forming channels CH1–CH8. The generated tone signal is supplied to the sound system 16.

In each of the tone forming channels CH1–CH8, a tone signal of a tone pitch corresponding to the assigned key code (i.e., tone pitch information) is formed and tone elements (tone color, pitch, volume envelope etc.) of the tone signal formed therein can be variably controlled in accordance with tone element control signals. The term "tone element control signals" is a generic term of various parameters used for forming a tone or controlling tone elements such as tone color setting parameter, pitch variation setting parameter, tone volume envelope shape setting parameter and other control envelope shape setting parameter and will be referred to as "tone parameters" hereafter. Therefore, the term "tone parameters" hereinafter designates not only the tone color, setting parameter in a narrow sense but designates generally the above mentioned various parameters used for forming a tone or controlling a tone color element.

A data ROM 19 prestores various data used for forming a tone and various data used for signal processing and particularly stores "tone parameters" concerning 64 kinds of tone colors. Tone color numbers 1–64 are assigned to these 64 kinds of tone colors and 64 sets of tone parameters TPMEM(1)–TPMEM(64) are read out in response to the tone color numbers applied to address inputs of the data ROM 19.

An operation panel section 20 comprises switches and operators for setting and selecting various data and operation modes and also comprises a display 21.

A tone color setting mode switch TCSET is a switch for selecting a tone color setting mode. The tone color setting mode is a mode in which processings including a processing for setting tone parameters individually for the respective channels, a processing for setting an order of assignment with respect to selected channels and a processing for dividing the channels into plural groups are performed.

A group switch GRP is operated for designating channels to be grouped in one group in dividing the respective channels into plural groups.

An alternative assign switch ALT is operated for designating channels with respect to which assignment is made in a certain order in setting the order of assignment with respect to plural channels. In this embodiment, in channels which have been designated for assignment in order, the order of arrangement of these channels constitutes directly the order of assignment. Such assignment in order is hereinafter referred to as alternative assign.

The display 21 performs indications of tone color numbers of tone parameters set for the respective channels, indication of state of setting of the alternative assign and indication of state of setting of channel groups. Several examples of contents of indications in this display 21 are shown in FIGS. 3a–3f. In the upper stage, channel numbers CH1–CH8 are indicated and the tone color numbers (1–64) of tone parameters set for the respective channel numbers are indicated below the respective channel numbers. An alternative assign indication "+" is indicated between tone color number indications of channels to which the alternative assign is applied. A grouping indication "<" is indicated at a channel to which the same tone color number has been assigned by the grouping processing. The alternative assign indication "+" is set by operation of the alternative assign switch ALT. The grouping indication "←" is set by operation of the group switch GRP. The grouping indication "←" indicates that the tone color number of the channel indicated by this grouping indication is the same as the tone color number of the channel which is located adjacently on the left side of this channel on the display 21.

A cursor CSR is displayed in the display 21. The cursor CSR moves to positions corresponding to the respective channels and also to intermediate positions between the respective channels (these cursor positions are shown by dotted lines in FIG. 3a) by operating a cursor key CSRK in the operation panel section 20.

A preset mode switch PSR is a switch for selecting a preset mode. The preset mode is a mode in which data of tone color number, alternative assign and grouping indication for each channel displayed on the display 21 is written into or, read out from, a memory circuit as one set of preset data (preset tone parameters). A preset write switch PSW is a switch operated when one set of data displayed on the display 21 is written into the memory circuit as one set of preset data.

LEDs (light-emission diodes) are provided for the tone color setting mode switch TCSET and preset mode switch PSR. These LEDs are exclusively lighted and extinguished in such a manner that when one switch TCSET (PSR) is turned on, an LED corresponding thereto is lighted and an LED corresponding to the other switch is extinguished. When the LED corresponding to the tone color setting mode switch TCSET is lighted, it represents the tone color setting mode and when the LED corresponding to the preset mode switch PSR is lighted, it represents the preset mode.

Ten key 22 consists of 10 numerical data input keys from 0 to 9 and is operated when numerical data such as the tone color number is applied.

The operation panel 20 comprises tone parameter editing operator group 23 and other various tone setting and tone controlling switches and operators (e.g., an operator for setting entire tone volume). The tone parameter editing operator group 23 is provided for changing and modifying individual elements (e.g., pitch change set amount and various parameter set amount) in tone parameters.

Figure 4:
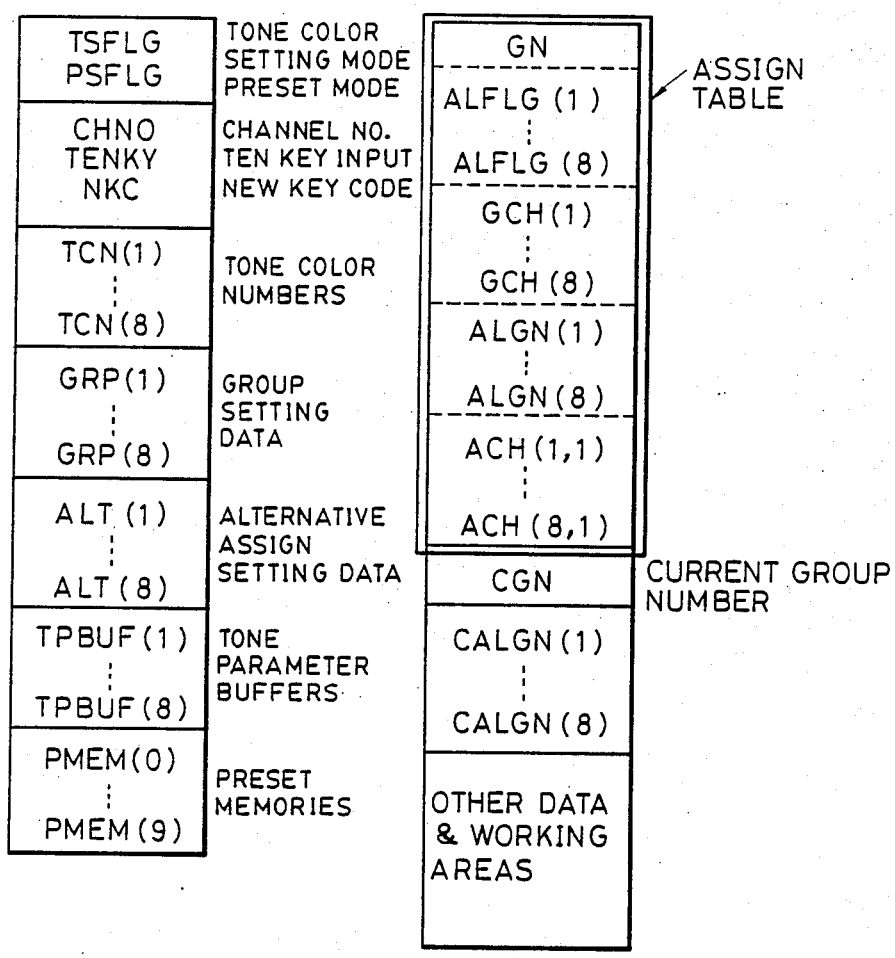
FIG. 4 is a memory map showing an example of memory data in a data and working RAM of FIG. 2.

Examples of flow charts of processings relating to the present invention among processings executed by the microcomputer in the tone signal generator 10 are shown in FIGS. 5–12. An example of contents of storage of the data and working RAM 13 used in connection with these processings is shown in FIG. 4.

TSFLG represents a tone color setting mode flag which is set to "1" when the tone color setting mode switch TCSET has been turned on and is reset to "0" when the preset mode switch PSR has been turned on.

PSFLAG is a preset mode flag which is set to "1" when the preset mode switch PSR has been turned on and is reset to "0" when the tone color setting mode switch TCSET has been turned on.

CHNO is a cursor channel number and represents a channel number corresponding to present position of the cursor CSR.

TENKY is ten key input data which is numerical data applied by the ten key 22.

NKC is a new key code which represents a newly depressed key (namely tone pitch of a tone to be newly generated) and a newly released key, and which is provided by the keyboard device 14 or the automatic performance device 15.

TCN(1)–TCN(8) are tone color numbers set for the respective channels. Figures in parenthesis represent channel numbers. For example, TCN(1) is the tone color number set for the channel 1 and, more specifically, it is one of 1–64.

GRP(1)–GRP(8) are group setting data representing group setting state of each channel. Figures in parenthesis represent channel numbers. For example, GRP(1) is the group setting data for channel 1 and, more specifically, it is either "1" (when grouping has been set by the group switch GRP) or "0" (when grouping has not been set).

ALT(1)–ALT(8) are alternative assign setting data representing alternative assign setting state of each channel. Figures in parenthesis represent channel numbers. For example, TPBUF(1) represents a specific tone parameter corresponding to tone color number TCN(1) set in the channel 1 and, more specifically, one of the tone parameters TPMEM(1)–TPMEM(64) read out from the data ROM 19 or data obtained by suitably changing or modifying the read out data by the tone parameter editing operator group 23.

PMEM(0)–PMEM(9) are preset memories. Figures in parenthesis represent preset numbers. These memories store ten sets of preset data.

"Assign table" stores various data necessary for orderly tone generation assignment in order by the alternative assign and tone generation assignment group by group. These data consist of group number data GN, alternative assign flags ALFLG(1)–ALFLG(8), channel-number-in-group data GCH(1)–GCH(8), alternative assign channel number data ALGN(1)–ALGN(8) and channel-number-by-alternative-assign-assignment-order data ACH(1,1)–ACH(8,8).

The group number data GN represents a group number set by the group setting processing.

The alternative assign flag ALFLG(1)–ALFLG(8) are flags indicating whether or not alternative assign should be performed for each of the set groups. Figures in parenthesis represent group numbers. For example, ALFLG(1) is alternative assign flag of group 1 and its contents are "1" when the alternative assign is made in this group and "0" when it is not made.

The channel-number-in-group data GCH(1)–GCH(8) represent channel numbers in each group. Figures in parenthesis represent group number. For example, GCH(1) is channel-number-in-group data of the group 1. If there are three channels CH1, CH2 and CH3 in this group, contents of this data consist of three channel numbers of "1", "2" and "3". If there is only one channel of CH4 in this group, its contents consist of one channel number of "4".

The alternative assign channel number data ALGN(1)–ALGN(8) represent numbers of channels to be assigned in order in a group in which alternative assign should be performed. For example, ALGN(1) alternative assign channel number data of the group 1. If this group is a group in which alternative assign should be performed and assignment should be made in order for 4 channels of CH3, CH4, CH5 and CH6, its contents are "4". If, in this case, assignment should be made in order, for example, CH3→ either CH4 or CH5→CH6, contents of the alternative assign channel number data are "3".

The channel-number-by-alternative-assign-assignment-order data ACH(1,1)-ACH(8,8) represent the number of channel corresponding to the assignment order in a group in which alternative assign should be made. The first figures in parenthesis represent the group number and the second figures the order of assignment. For example, if ACH(1,1) is channel number data of assignment order 1 in the group 1 and this is channel CH3, its contents are "3". If there are plural channels, e.g., CH3 and CH5 at the same assignment order, the data represents the respective channel numbers "4" and "5". If, for example, assignment is made in order for three channels of CH3, CH4 and CH5, the assignment order for CH3 is order 1, that for CH4 is order 2 and that for CH5 is order 3.

CGN is a current group number which represents the number of group in which the tone generation assignment processing is being performed.

CALGN(1)-CALGN(8) alternative assign current orders which represent orders of currently performed assignment processings in the order assignment by alternative assign. Figures in parenthesis represent a group number. For example, CALGN(1) represents alternative assign current order of the group 1. If the assignment processing is currently performed with respect to a channel of order 3, contents of the data are "3".

An area for storing the above described data or signals is provided in the data and working RAM 13. The data and working RAM 13 has also areas including an area for storing key data (key code and key-on signal which are obtained by the,, tone generation assignment processing) assigned to tone forming channels in the tone forming circuit 18, an area for storing detection data obtained by switch operations and on-off data of LEDs in the operation panel section 20 and other working areas.

For increasing storage of tone parameters and preset data, an external memory device 24 (FIG. 2) consisting of an external RAM or a floppy disc unit may be additionally provided.

Referring to FIG. 5, a main routine will be described. First, in a key event processing, a key-on event processing or a key-off event processing is performed in response to key data provided by the keyboard device 14 or the automatic performance device 15. More specifically, when a key code of a tone to be generated newly and a key-on event signal are supplied, the key-on event processing is performed to apply this key code to a tone forming channel. When a key code of a released key and a key-off event signal are supplied, the key-off event processing is performed to set a channel to which this key code is assigned to a key-release state. An example of the key-on event processing is shown in the flow chart of FIG. 11.

In a channel control operator scan processing, on-off states of channel control operators in the operation panel section 20 (i.e., tone color setting mode switch TCSET, group switch GRP, alternative assign switch ALT, preset mode switch PSR, preset write switch PSW, ten key 22 and cursor CSRK) are detected by scanning and, if a switch-on event has been detected by this scanning, predetermined switch-on event processings are executed. Examples of various switch-on event processings executed in this processing are shown in FIGS. 6 through 10.

In a tone parameter editing operators scan processing, an operation state of the tone parameter editing operator group 23 is detected by scanning and, in accordance with this detection, processings for changing and modifying contents of tone parameter buffers TPBUF(-1)-TPBUF(8) are performed.

If the tone color setting mode switch TCSET has been turned on, a TCSET on event processing shown in FIG. 6 is executed. In this processing, the tone color setting mode flag TSFLG is set to "1" and the preset mode flag PSFLG is reset to "0"The LED corresponding to the tone color setting mode switch TCSET is lighted and the LED corresponding to the preset mode switch PSR is extinguished to bring the mode into the tone color setting mode.

If the preset mode switch PSR has been turned on, a PSR on event processing shown in FIG. 7 is executed. In this processing, the preset mode flag PSFLG is set to "1" and the tone color setting mode flag TSFLG is reset to "0"The LED corresponding to the preset mode switch PSR is lighted and the LED corresponding to the tone color setting mode switch TCSET is extinguished to bring the mode into the preset mode.

Figure 8:
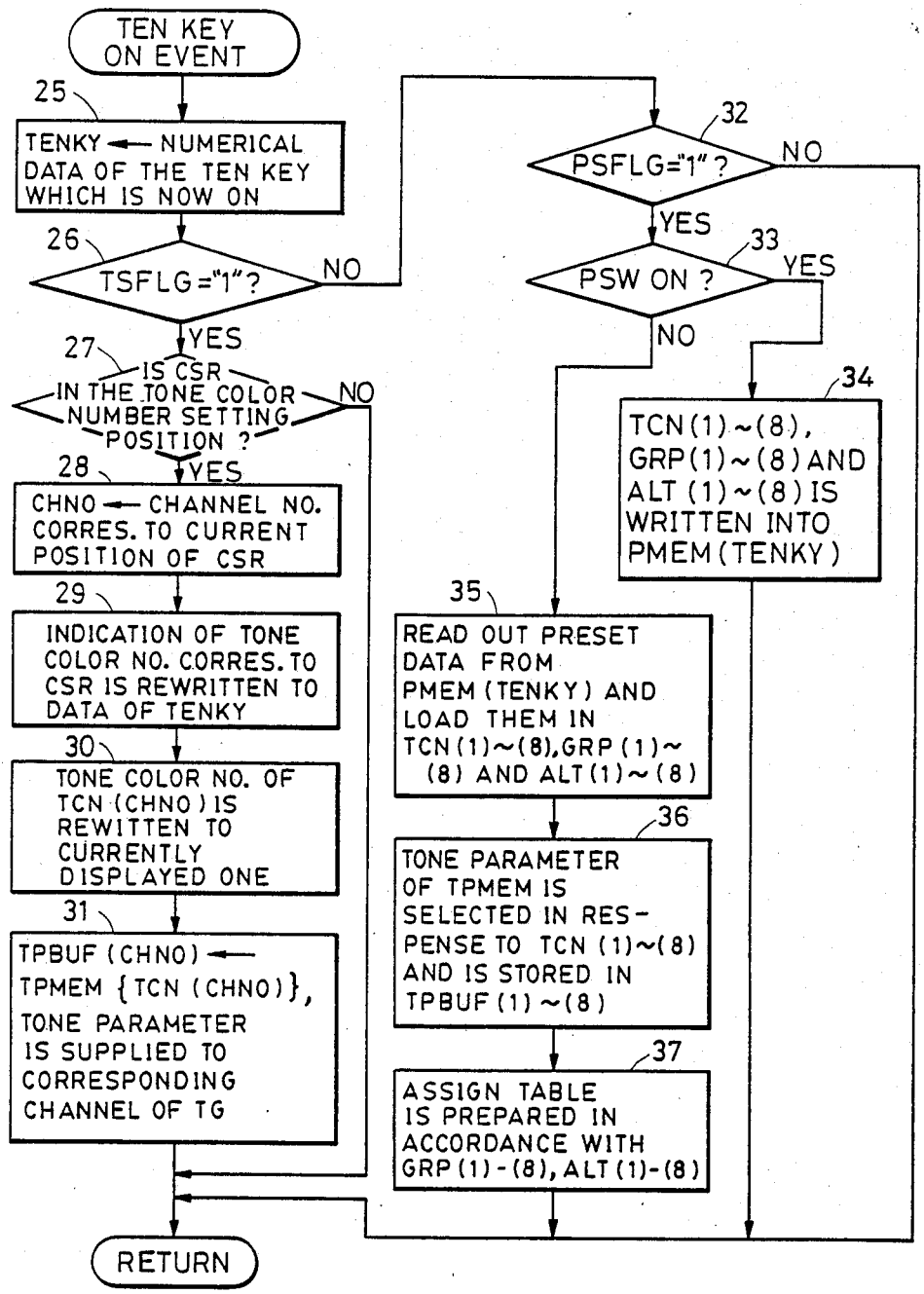

If any of key switches of the ten key 22 has been turned on, a ten key event processing shown in FIG. 8 is executed. First, in step 25, numerical data of the ten key which is now on is loaded as ten key input data TENKY. In step 26, whether the tone color setting mode flag TSFLG is "1" or not is examined.

If step 26 is YES, i.e., the mode is the tone color setting mode, whether the cursor CSR is in the tone color number setting position (i.e., position corresponding to each channel) or not is examined in step 27. If step 27 is YES, it means that the current ten key operation has been made for setting the tone color number and the processing proceeds to step 28. In step 28, the channel number corresponding to the current position of the cursor CSR is loaded as cursor channel number CHNO. In next step 29, the indication of a tone color number corresponding to the position of the cursor CSR on the display 21 is rewritten to numerical data of the ten key input data TENKY. In next step 30, a tone color number of the channel designated by the cursor channel number CHNO (one of TCN(1)-TCN(8) and this is designated by TCN(CHNO)) is rewritten to tone color number which is currently displayed on the display 21 in correspondence to this channel. In next step 31, a tone parameter corresponding to the tone color number TCN(CHNO) which has been set to the relevant channel is taken out of tone parameters TPMEM(1)-TPMEM(64) prestored in the data ROM 19 and this tone parameter is stored in a tone parameter buffer designated by the cursor channel number CHNO (one of TPBUF(1)-TPBUF(8) and this is designated by TPBUF(CHNO)) and is also supplied to a tone forming channel (designated by CH(CHNO)) designated by the cursor channel number CHNO in the tone forming circuit 18 (abbreviated in the flow chart as TG). The tone forming channel CH(CHNO) which has received the supplied tone parameter stores it in a suitable manner and performs controls of various tone elements in response to this tone parameter.

If step 26 is NO, i.e., the mode is the preset mode, it is confirmed that the preset mode flag PSFLG is "1" in step 32 and the processing proceeds to step 33. If the flag PSFLG is "0", the processing proceeds to "return". In the preset mode, the ten key 22 is used for selecting preset numbers from 0 to 9.

In step 33, whether the preset write switch PSW is on or not is examined. If it is on, the processing proceeds to step 34 in which writing of preset data is performed. In step 34, one set of preset data consisting of one of the tone color numbers TCN(1)-TCN(8) set for the respective channels, one of the group setting data GRP(1)-GRP(8) of the respective channels and one of the alternative assign setting data ALT(1)-ALT(8) of the respective channels is written into one of the preset memories corresponding to the preset number corresponding to numerical data of the ten key input data TENKY (one of PMEM(0)-PMEM(9) and this is designated by PMEM(TENKY)).

Figure 12:
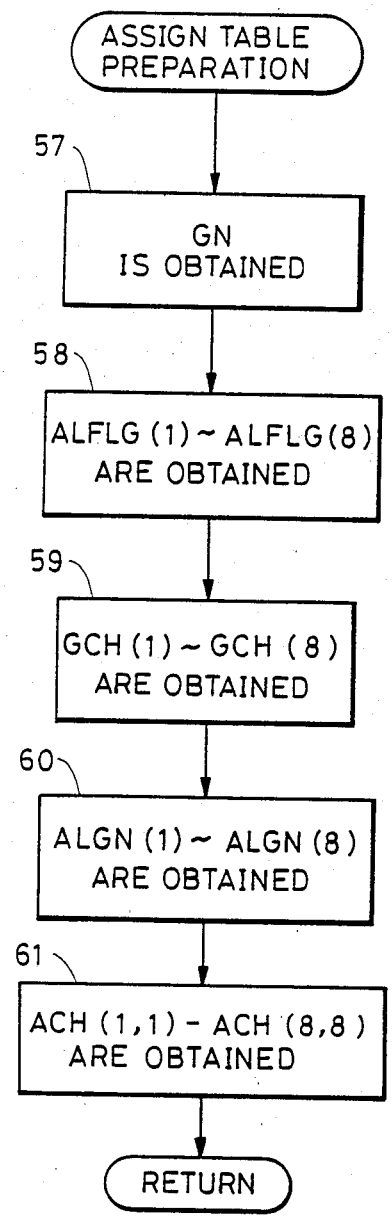

If the preset write switch PSW is off, the processing proceeds to step 35 in which reading of the preset data is performed. In step 35, one set of preset data is read out from the preset memory PMEM(TENKY) corresponding to the preset number corresponding to numerical data of the ten key input data TENKY and the read out preset data is loaded in a register as one of the tone color numbers TCN(1)-TCN(8) for the respective channels, group setting data GRP(1)-GRP(8) of the respective channels and alternative assign setting data ALT(1)-ALT(8) of the respective channels. In next step 36, responsive to one of tone color numbers TCN(1)-TCN(8) of the respective channels which has been loaded, a tone parameter corresponding to this tone color number is selected from among the tone parameters TPMEM(1)-TPMEM(64) prestored in the data ROM 19 and the selected tone parameter is stored in one of the tone parameter buffers TPBUF(1)-TPBUF(8) of the respective channels and also is supplied to the tone forming channels CH1-CH8 of the tone forming circuit 18. The tone forming channel which has received the supplied tone parameter stores it in a suitable manner and performs controls of various tone elements. In next step 37, the above described assign table is prepared in accordance with the group setting data GRP(1)-GRP(8) and alternative assign data ALT(1)-ALT(8) of the respective channels which have been written. A subroutine for preparing this assign table is shown in FIG. 12. Detailed description about FIG. 12 will be made later.

Figure 9:
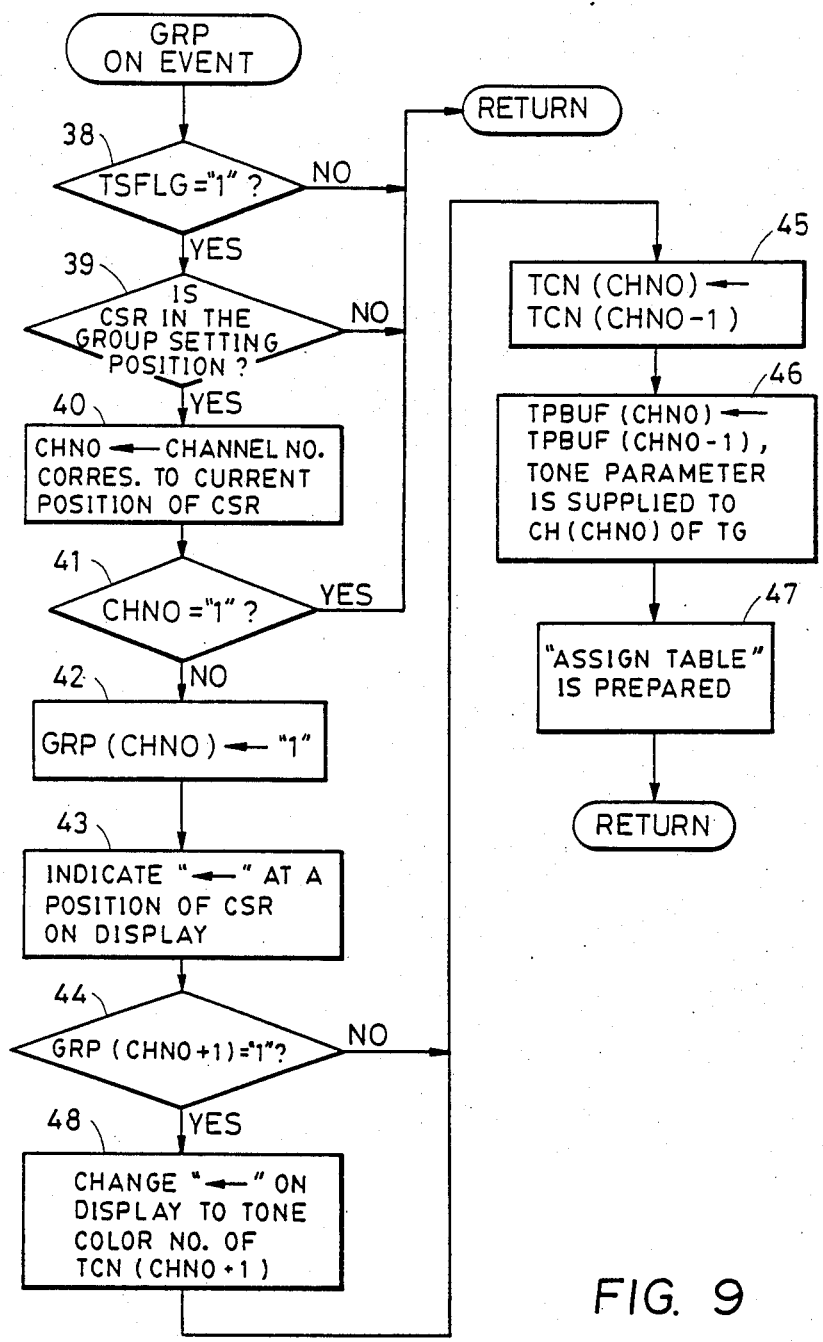

Upon turning on of the group switch GRP, a GRP on event shown in FIG. 9 is executed. First, in step 38, whether the tone color setting mode flag TSFLG is "1" or not is examined. If it is YES, i.e., the mode is the tone color setting mode, the processing proceeds to next step 39. If step 38 is NO, the processing proceeds to "return". In step 39, whether or not the cursor CSR on the display 21 is in the group setting position position indicating the grouping indication "←", i.e., position corresponding to each channel number) is examined. If step 38 is YES, the processing proceeds to next step 40 whereas if it is NO, the processing proceeds to "return". In step 40, a channel number corresponding to the current position of the cursor CSR is loaded as the channel number CHNO. In next step 41, whether the loaded CHNO is channel 1 or not is examined. The grouping indication "←" set in this GRP on event processing is an indication representing that the tone color number of the channel for which this grouping indication "←" is indicated is the same as the tone color number which is adjacently on the left side in the display 21. Since there is no left side channel to the channel the grouping indication "←" has no particular sense. Accordingly, for avoiding displaying the grouping indication "←" as to the channel 1, the processing proceeds to "return" if step 41 is YES and proceeds to next step 42 if step 41 is NO.

In step 42, group setting data designated by the cursor channel number CHNO (one of GRP(1)-GRP(8) and this is designated by GRP(CHNO)) is set to "1". In next step 43, the indication of the tone color number corresponding to the position of the cursor CSR on the display 21 is rewritten to the grouping indication "←". Then, the processing proceeds to step 45 via step 44. In step 45, the tone color number TCN(CHNO) of the channel designated by the cursor channel number CHNO is caused to have the same value as the tone color number of a channel which is designated by a value CHNO−1 i.e., CHNO minus 1, (i.e., tone color number TCN(CHNO−1) which is adjacently on the left side of the currently indicated grouping indication "<" on the display 21). In next step 46, contents of the tone parameter buffer TPBUF(CHNO) of the channel for which the grouping indication "←" has been set by the above processing are caused to become the same as contents of the tone parameter buffer TPBUF(CHNO−1) which is adjacently on the left side on the display 21. The tone parameter of this tone parameter buffer TPBUF(CHNO) is supplied to the tone forming channel CH(CHNO) in the tone forming circuit 18 designated by the cursor channel number CHNO. In next step 47, "assign table" is prepared according to the subroutine shown in FIG. 12.

In step 44, value CHNO+1 which is cursor channel number CHNO added with 1 is obtained and whether group setting data GRP (CHNO+1) of a channel designated by this value CHNO+1 is "1" or not is examined. In other words, whether a channel which is adjacently on the right side of the channel on the display 21 for which the grouping indication "←" has been set by the current processing is indicated by the grouping indication "←" or not is examined. If result is NO, the processing proceeds to step 45 and the above described processing is executed. If result is YES, the processing of step 48 is executed and thereafter the processing of step 45 is executed. In step 48, the indication at the tone color number indication of the channel number CHNO+1 on the display 21 is replaced by the grouping indication "←" thereby changing the indication to numerical value of tone color number TCN(CHNO+1) of the channel of the number CHNO+1. Since the tone color number of the channel of CHNO+1 becomes different from the tone color number indication of the adjacently left side (i.e., CHNO), the indication of CHNO,+1 is replaced by the grouping indication "←" to change the value to numerical value indicating the original tone color number.

Figure 10:
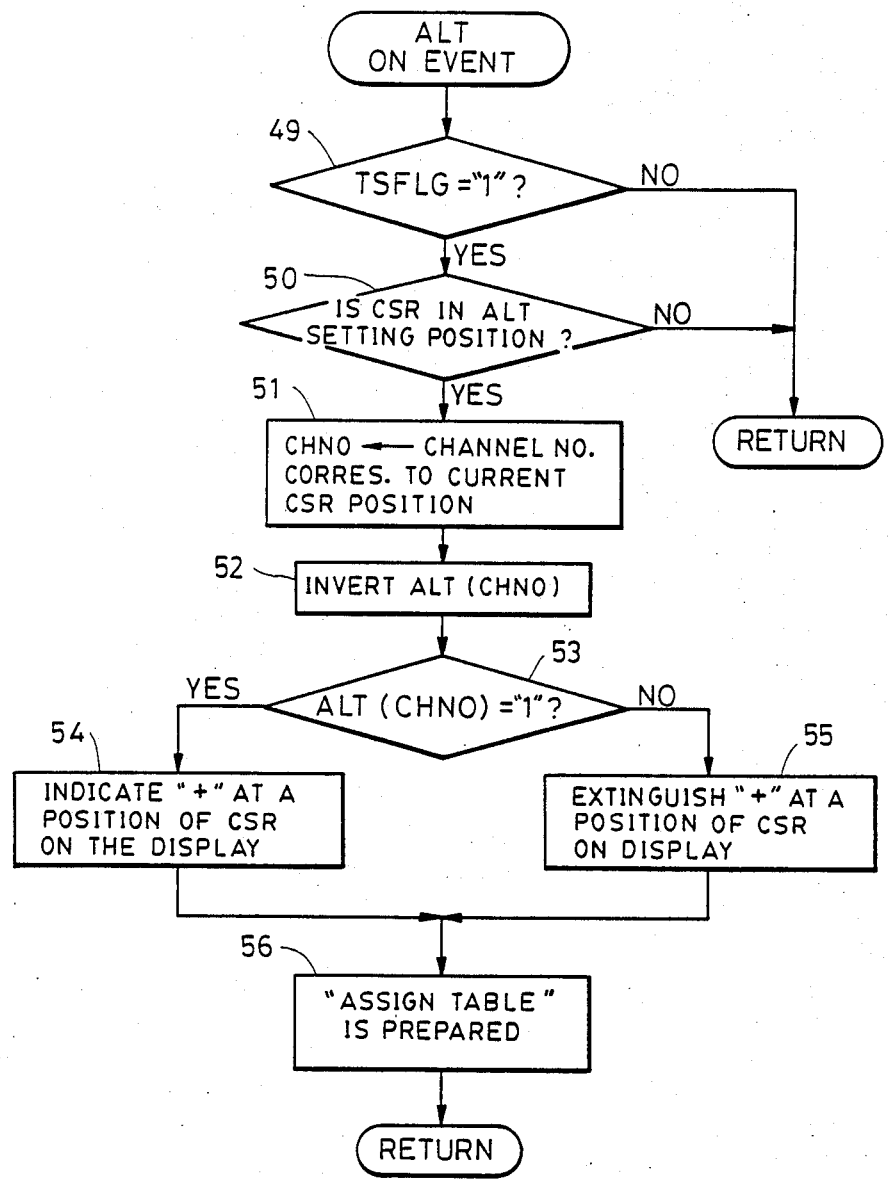

Upon turning on of the alternative assign switch ALT, the ALT on event processing in FIG. 10 is executed. In step 49, whether the tone color setting mode flag SFLG is "1" or not is examined. If result is YES, i.e., the mode is the tone color setting mode, the processing proceeds to next step 50. If result is NO, the processing proceeds to "return". In step 50, whether the cursor CSR on the display 21 is at a position for indicating alternative assign setting position (i.e., position for indicating the alternative assign indication "+" which is position intermediate tone color indications corresponding to the respective channel numbers) or not is examined. If result is YES, the processing proceeds to step 51. If result is NO, the processing proceeds to "return". In step 51, the channel number corresponding to the current position of the cursor CSR is loaded as the cursor channel number CHNO. It is assumed that the channel number in this case is a channel number which is adjacently on the right side of the cursor CSR. For example, if the cursor CSR is at an intermediate position between the channels CH1 and CH2, the channel number of the cursor position is "2".

In step 52, alternative assign setting data (one of ALT(1)-ALT(8) and is designated by ALT(CHNO)) of the channel designated by the cursor channel number CHNO is inverted to "1" or "0". In other words, each time the alternative assign switch ALT is turned on, the alternative assign setting data is inverted. In next step 53, whether the alternative assign setting data ALT(CHNO) designated by the cursor channel number CHNO is "1" or not is examined. If result is YES, the processing proceeds to step 54 to indicate the alternative assign indication "+" in correspondence to the position of the cursor CSR on the display 21. If result is NO, the processing proceeds to step 55 in which the alternative assign indication "+" at the position of the cursor CSR on the display 21 is extinguished. In next step 56, "assign table" is prepared in accordance with the subroutine of FIG. 12.

By executing processings in the above described order in accordance with turning on of the group switch GRP or alternative assign switch ALT, states of the group setting data GRP(1)-GRP(8) and alternative assign setting data ALT(1)-ALT(8) of the respective channels established The tone generation assignment in order (i.e., alternative assign processing) and the tone generation assignment by group are performed in accordance with the established states of these data GRP(1)-GRP(8) and ALT(1)-ALT(8). In accordance with these set data GRP(1)-GRP(8) and ALT(1)-ALT(8), "assign table" is prepared according to the subroutine of FIG. 12. Utilizing the prepared "assign table", the tone generation assignment is performed in accordance with the key-on event processing shown in FIG. 11.

The assign table preparation subroutine of FIG. 12 will now be described. First, group number data GN is obtained in step 57. In the present embodiment, manner of grouping depends upon the following two standards:

(1) one is to consider plural channels for which the same tone color number has been set by the grouping indication "←" as belonging to the same group, and (2) the other is to consider plural channels for which the order of assignment has been established by the alternative assign indication "+" as belonging to the same group.

Accordingly, in step 57, by way of example, the group number GN is obtained by counting the number of channels in which contents of the group setting data GRP(1)-GRP(8) and contents of the alternative assign setting data ALT(1)-ALT(8) are both "0". Since a channel in which contents of the group setting data GRP(1)-GRP(8) are both "0" is the first channel in each group, the number of groups can be found by counting the number of such channels.

In next step 58, alternative assign flags ALFLG(1)-ALFLG(8) are obtained group by group. each flag can be determined by examining, for each group which can be determined in the above described manner, whether or not there is "1" in the alternative assign setting data ALT(1)-ALT(8) of a channel belonging to each group. In the group in which the alternative assign is to be performed, this flag becomes "1".

In next step 59, channel-number-in-group data GCH(1)-GCH(8) are obtained group by group. In this step, this data can be determined by listing up the number of channel belonging to each group which can be determined in the above described manner.

In next step 60, alternative assign channel number data ALGN(1)-ALGN(8) are obtained group by group. In this step, this data can be determined by counting the number of channels belonging to each group which can be determined in the above described manner.

In next step 61, channel-number-by-alternative-assign-assignment-order data ACH(1)-ACH(8) are obtained for each order of assignment with respect to each group. In this step, order is established for channels in which the group setting data GRP(1)-GRP(8) is "0" with respect to groups in which the alternative assign flags ALFLG(1)-ALFLG(8) is "0" among groups which can be determined in the above described manner and the channel numbers of the channels thus arranged in order are memorized. A channel in which the group setting data GRP(1)-GRP(8) is "1" is treated as channels of the same order as immediately preceding channel. In other words, plural channels for which grouping has been set by the group switch GRP are treated as channels of the same order in the alternative assign.

Figure 11:
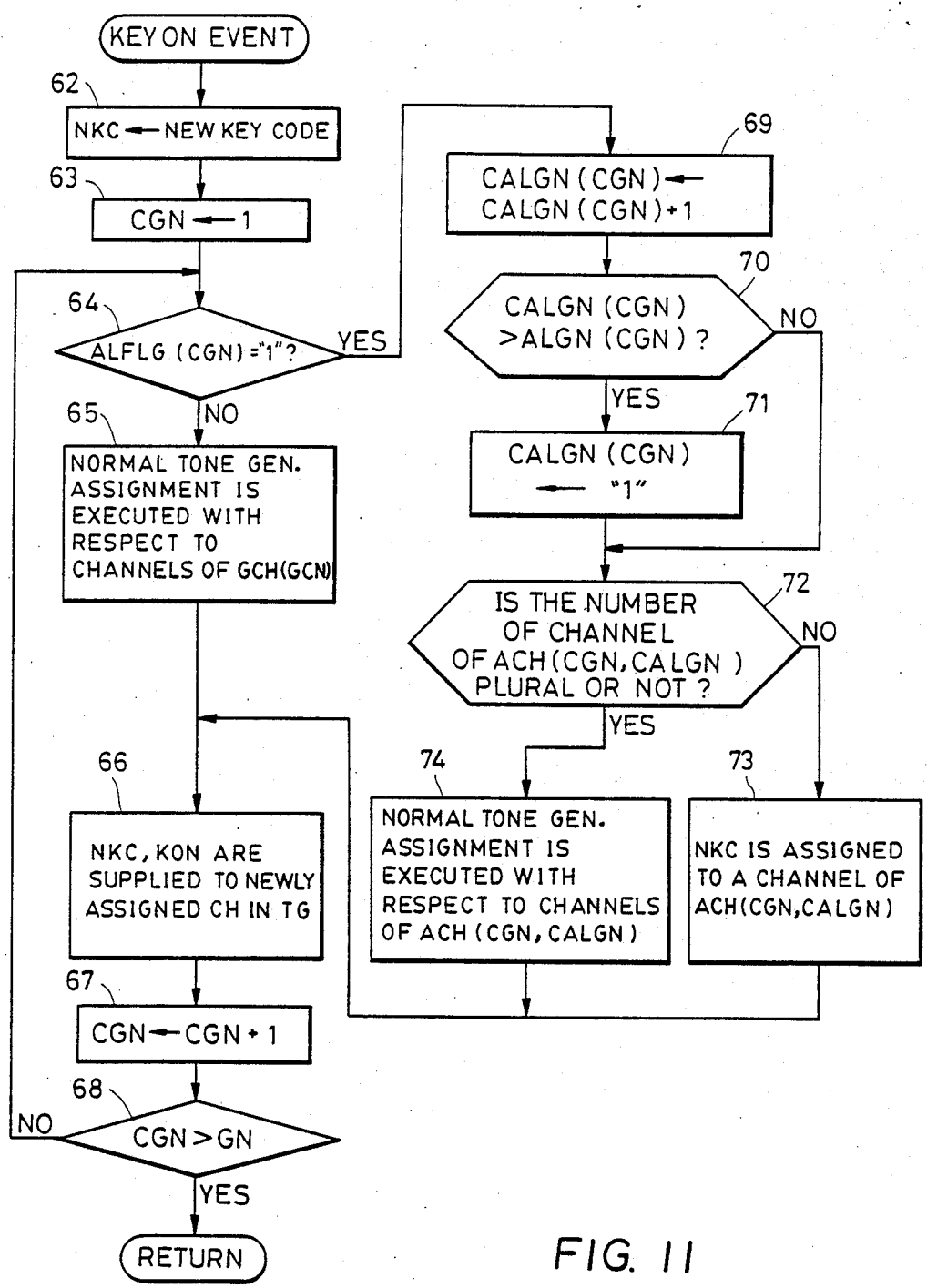

The key-on event processing in FIG. 11 will now be described. In step 62, a key code relating to the key-on event (i.e., a key code of a tone which is to be newly assigned for tone generation) is loaded as new key code NKC. In next step 63, current group number CGN is set to initial value "1". In next step 64, whether alternative assign flag of a group designated by the current group number CGN (one of ALFLG(1)-ALFLG(8) and is designated by ALFLG(CGN)) is "1" or not is examined. If result is "1", the processing proceeds to step 69 in which the alternative assign processing is executed. If result is not "1", the processing proceeds to step 65 in which normal tone generation assignment processing is executed.

In step 65, normal tone generation assignment processing is executed with respect to a channel or channels in a group designated by the current group number CGN which channel is specified by channel-number-in-group data (one of GCH(1)-GCH(8) and designated by GCH(CGN)) in the group. The normal tone generation assignment processing means that, for example, a known tone generation assignment processing such as making a vacant channel by a known truncating processing and assigning a new key code to this vacant channel. In a case where the channel in the group consists of a single channel only, a late coming preference processing is performed in such a manner that assignment of a preceding tone is cancelled even if the key for the preceding tone is still being depressed and a new key code is assigned so that generation of a tone to be sounded newly is started immediately.

In next step 66, in correspondence to the channel which has been newly assigned in the above described manner, new key code NKC and key-on signal KON are supplied to the tone forming circuit 18. In this channel of the tone forming circuit 18, the supplied new key code NKC and key-on signal KON are properly stored and a tone signal of tone pitch corresponding to this key code is formed in response to these signals. In this case, various tone elements of the tone signal thus formed are controlled by tone parameters supplied in the foregoing manner. Further, in this case, a preceding tone which has been assigned to this channel in the tone forming circuit 18 is still being sounded, the sounding of the preceding tone is rapidly attenuated by damp control.

In next step 67, value of the current group number CGN is increased by 1 to change the group to which tone generation is to be assigned. In next step 68, whether value of the current group number CGN which has been increased by 1 is larger than value of the group number data GN or not is examined. If result is YES, it means that assignment of all groups has been completed so that the processing proceeds to "return". If result is NO, it means that there is group or groups for which tone generation assignment should be made so that the processing proceeds to step 64 and the same tone generation assignment processing as described above is repeated.

In executing the alternative assign processing, the processing is branched from step 64 to step 69 as described above. In step 69, value of alternative assign current order designated by the current group number CGN (this is one CALGN(1)-CALGN(CGN) and is designated by CALGN(CGN)), i.e., value indicating the order of assignment by alternative assign which is to be currently executed, is increased by 1. The alternative assign current orders CALGN(1)-CALGN(8) of the respective groups are assumed to be initially set to "0" when the power source is thrown in and the preset data is read out. Accordingly, when the alternative assign is started, the value of the alternative assign current order CALGN(CGN) becomes "1" (i.e., initial order of assignment) by the processing of this step 69.

In next step 70, whether or not the value of the alternative assign current order CALGN(CGN) is larger than the value of alternative assign channel number data of the same group designated by the current group number CGN (this is one of ALGN(1)-ALGN(8) and is designated by ALGN(CGN)) is examined. If result is YES, it means that the order of assignment designated by the alternative assign current order CALGN(CGN) is larger than the channel number which is the object of the alternative assign in that group, i.e., it is an order which actually does not exist. In step 71, the value of this CALGN(CGN) is returned to "1" which is the initial order of assignment. If result is NO, the processing proceeds to step 72, jumping over step 71.

In step 72, referring to data corresponding to the current group number CGN and alternative assign current order CALGN(CGN) (this data is designated by ACH(CGN, CALGN)) among the channel-number-by-alternative-assign-assignment-order data ACH(1,-1)-ACH(8,8) in the "assign table", whether the number of channel corresponding to this order of assignment is plural or not is examined. Since, for example, the number of channel is 1 at the order of assignment of channel 5, 6, 7 or 8 in FIG. 3d or channel 4 or 5 in FIG. 3e, result of step 72 is NO. On the other hand, channels 6, 7 and 8 of FIG. 3e are of the same order of assignment and channels 3, 4 and 5 of FIG. 3f are of the same order of assignment, the number of channel is plural at these orders of assignment so that result of step 72 is YES.

If the result of step 72 is NO, the processing proceeds to step 73 in which one channel specified by the above described channel-number-by-alternative-assign-assignment-order data ACH(CGN,CALGN) is determined to be the channel to which the new key code NKC is to be assigned.

On the other hand, if result in step 72 is YES, the processing proceeds to step 74 in which normal assignment is executed with respect to plural channels specified by the above described channel-number-by-alternative-assign-assignment-order data ACH(CGN,CALGN) to determine one channel to which the new key code NKC is to be assigned.

After determining one channel to which the new key code NKC is to be assigned by step 73 or 74, the processing proceeds to the above described step 66 in which the same processing is repeated.

As will be apparent from the foregoing description, the assignment processing for one new key code NKC is executed with respect to each group whereby sounding of tone corresponding to the new key code NKC is assigned group by group. Accordingly, a tone corresponding to the same key code is generated in plural channels corresponding to the number of groups. Further, in a group in which the alternative assign is executed, the order of assignment is changed by the processing in step 69 each time the new key code KNC is provided (i.e., at each timing at which the tone is to be generated). In this case, upon completion of assignment of the final order, the processing is returned to the initial order by the processing of step 71 so that the order of assignment is repeatedly changed.

In the key-off event which is not illustrated, a key code relating to the key-off event is loaded as new key code NKC, a channel to which this new key code has been assigned is detected, and a key-off signal corresponding to the detected channel is supplied to the tone forming circuit 18.

If the tone color number of tone parameters established for the respective channels, alternative assign indication "+" and grouping indication "←" appearing on the display 21 are as shown in examples of FIGS. 3a-3f, states of corresponding tone color numbers TCN(1)-TCN(8), group setting data GRP(1)-GRP(8) and alternative asssign setting data ALT(1)-ALT(8) of the respective channels in the RAM 13 are as shown in the following Tables 1a through 1f. In other words, by setting these data as shown in Tables 1a through 1f, display indications as shown in the examples of FIGS. 3a through 3f can be obtained. Further, contents of "assign table" prepared in response to the data GRP(1)-GRP(8) and ALT(-1)-ALT(8) determined as shown in Tables 1a through 1f are as shown in the following Tables 2a through 2f.

TABLE 1a

| CH  | (1) | (2) | (3) | (4) | (5) | (6) | (7) | (8) |
|-----|-----|-----|-----|-----|-----|-----|-----|-----|
| TCN | 13  | 5   | 9   | 21  | 32  | 17  | 25  | 43  |
| GRP | 0   | 0   | 0   | 0   | 0   | 0   | 0   | 0   |
| ALT | 0   | 0   | 0   | 0   | 0   | 0   | 0   | 0   |

TABLE 2b

GN = 2
GCH (1) = 1, 2, 3, 4, 5
GCH (2) = 6, 7, 8
ALFLG (1) = 0
ALFLG (2) = 0

TABLE 2a

| GN = 8 | |
|---|---|
| GCH (1) = 1 | ALFLG (1) = 0 |
| GCH (2) = 2 | ALFLG (2) = 0 |
| GCH (3) = 3 | ALFLG (3) = 0 |
| GCH (4) = 4 | ALFLG (4) = 0 |
| GCH (5) = 5 | ALFLG (5) = 0 |
| GCH (6) = 6 | ALFLG (6) = 0 |
| GCH (7) = 7 | ALFLG (7) = 0 |
| GCH (8) = 8 | ALFLG (8) = 0 |

TABLE 1b

| CH | (1) | (2) | (3) | (4) | (5) | (6) | (7) | (8) |
|---|---|---|---|---|---|---|---|---|
| TCN | 17 | 17 | 17 | 17 | 17 | 27 | 27 | 27 |
| GRP | 0 | 1 | 1 | 1 | 1 | 0 | 1 | 1 |
| ALT | 0 | 0 | 0 | 0 | 0 | 0 | 0 | 0 |

TABLE 1c

| CH | (1) | (2) | (3) | (4) | (5) | (6) | (7) | (8) |
|---|---|---|---|---|---|---|---|---|
| TCN | 5 | 5 | 5 | 23 | 23 | 23 | 51 | 51 |
| GRP | 0 | 1 | 1 | 0 | 1 | 1 | 0 | 1 |
| ALT | 0 | 0 | 0 | 0 | 0 | 0 | 0 | 0 |

TABLE 2c

| GN = 3 | |
|---|---|
| GCH (1) = 1, 2, 3 | ALFLG (1) = 0 |
| GCH (2) = 4, 5, 6 | ALFLG (2) = 0 |
| GCH (3) = 6, 7 | ALFLG (3) = 0 |

TABLE 1d

| CH | (1) | (2) | (3) | (4) | (5) | (6) | (7) | (8) |
|---|---|---|---|---|---|---|---|---|
| TCN | 6 | 6 | 6 | 6 | 13 | 25 | 41 | 57 |
| GRP | 0 | 1 | 1 | 1 | 0 | 0 | 0 | 0 |
| ALT | 0 | 0 | 0 | 0 | 0 | 1 | 1 | 1 |

TABLE 2d

| GN = 2 | |
|---|---|
| GCH (1) = 1, 2, 3, 4 | ALFLG (1) = 0 |
| GCH (2) = 5, 6, 7, 8 | ALFLG (2) = 1 |
| ALGN (2) = 4 | ACH (2, 1) = 5 |
| | ACH (2, 2) = 6 |
| | ACH (2, 3) = 7 |
| | ACH (2, 4) = 8 |

TABLE 1e

| CH | (1) | (2) | (3) | (4) | (5) | (6) | (7) | (8) |
|---|---|---|---|---|---|---|---|---|
| TCN | 13 | 13 | 13 | 16 | 21 | 31 | 31 | 31 |
| GRP | 0 | 1 | 1 | 0 | 0 | 0 | 1 | 1 |
| ALT | 0 | 0 | 0 | 0 | 1 | 1 | 0 | 0 |

TABLE 2e

| GN = 2 | |
|---|---|
| GCH (1) = 1, 2, 3 | ALFLG (1) = 0 |
| GCH (2) = 4, 5, 6, 7, 8 | ALFLG (2) = 1 |
| ALGN (2) = 3 | ACH (2, 1) = 4 |
| | ACH (2, 2) = 5 |
| | ACH (2, 3) = 6, 7, 8 |

TABLE 1f

| CH | (1) | (2) | (3) | (4) | (5) | (6) | (7) | (8) |
|---|---|---|---|---|---|---|---|---|
| TCN | 26 | 26 | 5 | 5 | 5 | 33 | 33 | 33 |
| GRP | 0 | 1 | 0 | 1 | 1 | 0 | 1 | 1 |
| ALT | 0 | 0 | 0 | 0 | 0 | 1 | 0 | 0 |

TABLE 2f

| GN = 2 | |
|---|---|
| GCH (9) = 1, 2 | |
| GCH (2) = 3, 4, 5, 6, 7, 8 | |
| ALFLG (1) = 0 | |
| ALFLG (2) = 1 | |
| ALGN (2) = 2 | |
| ACH (2, 1) = 3, 4, 5 | |
| ACH (2, 2) = 6, 7, 8 | |

Figure 3A:
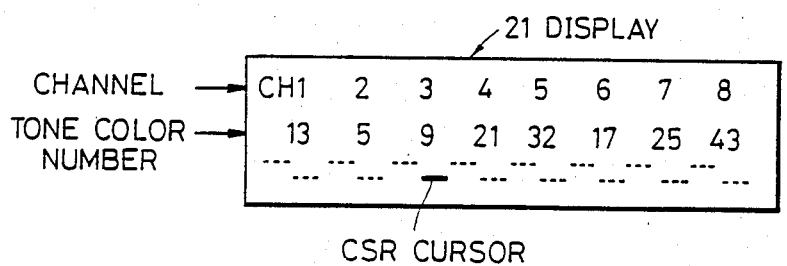
FIGS. 3a-3f are diagrams showing several examples of contents of indications on a display shown in FIG. 2.

FIG. 3a shows an example in which different tone color numbers have been established for all channels. By this arrangement, the number of group becomes the same as the number of channels so that each group consists of one channel. In this case, a single tone is produced and a tone corresponding to one tone pitch (one key) is assigned to all of the channels. Accordingly, a tone corresponding to one tone pitch (one key) is sounded simultaneously in 8 channels (with different tone colors from one another channel). Tables 1a and 2a correspond to FIG. 3a.

Figure 3B:
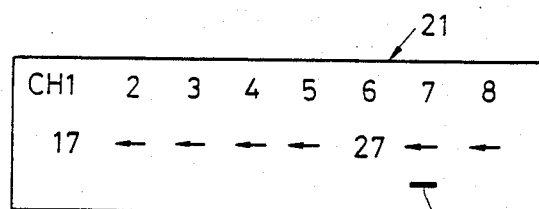

FIG. 3b shows an example in which channels are divided into 2 groups of channels CH1-CH5 and channels CH6-CH8. These groups have been set by indicating the grouping indication "←" by operating the group switch GRP as described above and the same tone color number is set for channels belonging to the same group. Although this is a two channel sounding system, all tones are not sounded in two channels because the number of channels in each group is different from each other. More specifically, five different tones can be assigned to channels CH1-CH5 of the first group and three tones thereof are assigned also to channels CH6-CH8 of the second group so that these three tones are sounded in the two channels and the remaining two tones are sounded in one channel only. Tables 1b and 2b correspond to FIG. 3b. The tone generation assignment for each group is performed in accordance with the normal tone generation assignment processing (i.e., the processings of steps 63, 64, 65, 66, 67 and 68 in FIG. 10).

Figure 3C:
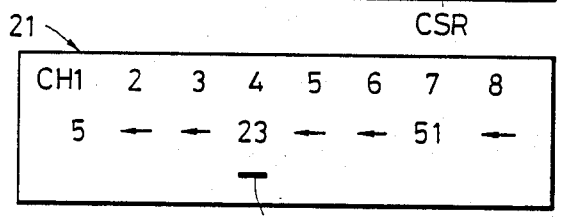

FIG. 3c shows an example in which channels are divided into three groups of channels CH1-CH3, channels CH4-CH6 and channels CH7 and CH8. In the same manner as in the above described example, these groups are set by indicating the grouping indication "←" by operating the group switch GRP and the same tone color number is set for channels belonging to the same group. This is a three channel sounding system. Different three tones can be assigned to channels CH1-CH3 of the first group and the same three tones are assigned also to channels CH4-CH6 of the second group and two tones thereof are assigned also to channels CH7 and CH8 of the third group. Accordingly, two tones are sounded in three channels and the other one tone is sounded in two channels. Tables 1c and 2c correspond to FIG. 3c. The tone generation assignment for each group is performed in accordance with the normal tone generation assignment processing.

Figure 3D:
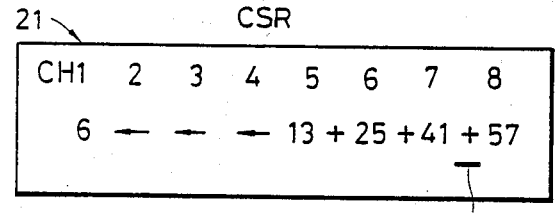
Figure 3E:
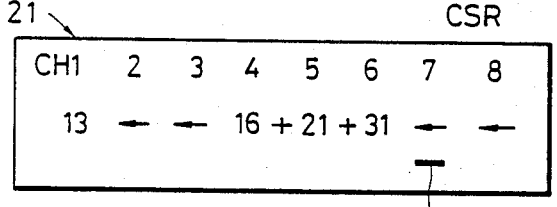
Figure 3F:
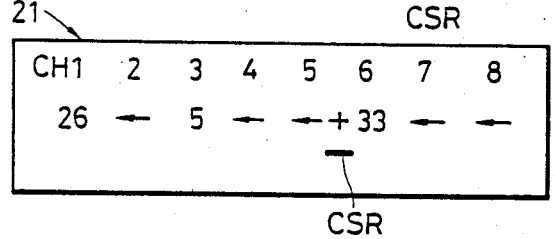

FIG. 3d shows an example in which channels are divided into two groups of channels CH1-CH4 and channels CH5-CH8. The first group consisting of channels CH1-CH4 is set by indicating the grouping indication "←" by operating the group switch GRP as described above whereas the second group consisting of channels CH5-CH8 is set by indicating the alternative assign indication "+" by operating the alternative assign switch ALT in the above described manner. In this case, the tone generation assignment of the first group consisting of channels CH1-CH4 is performed in accordance with the normal tone generation assignment processing in the same manner as described above whereas the tone generation assignment of the second group consisting of channels CH5-CH8 is performed in accordance with the alternative assign processing (i.e., the processings of steps 69, 70, 71, 72 and 73 of FIG. 10). Assuming, for example, that keys C4, D4, G4, A4, F4 and E4 have been depressed in this order (timing of releasing the key does not necessarily follow this order), these depressed keys are assigned to some of channels CH1-CH4 of the first group in accordance with the normal tone generation assignment processing and tones of these keys are generated with the tone color of the same tone color number 6. In parallel with this, these depressed keys are sequentially assigned to channels CH5-CH8 of the second group and tones of these keys are generated with different tone colors from one another. This sequential assignment is made in orderly manner such that C4 is assigned to CH5, D4 to CH6, G4 to CH7, A4 to CH8, F4 to CH5 and E4 to CH6. This order assignment control is made compulsorily and, accordingly, if C4 which is precedingly sounded in channel CH5 for example has not been released yet, the assignment of C4 in channel CH5 is cancelled in response to depression of F4 and F4 is assigned to channel CH5. Tables 1d and 2d correspond to FIG. 3d.

The tone color number set in channels which becomes objects of the alternative assign processing need not be different from each other but may be the same tone color number. This is because different characteristics can be realized as long as any tone element can be controlled such, for example, that contents of the pitch control are made different from each other if there is a pitch control function channel by channel.

FIG. 3e shows an example in which channels are divided into two groups of channels CH1-CH3 and channels CH4-CH8. The first group consisting of channels CH1-CH3 is set by operating the group switch GRP in the same manner as described above. The second group consisting of channels CH4-CH8 is set by indicating the alternative assign indication "+" by operating the alternative assign switch ALT with respect to channels CH5 and CH6 and also is set by further making the group setting by operating the group switch GRP with respect to channels CH7 and CH8 which are adjacently on the right side of the channel which is the object of the alternative assign and thereby setting order for channels CH6-CH8 to the same assignment order "3" in the alternative assign. The tone generation assignment of the first group consisting of channels CH1-CH3 is performed in accordance with the normal tone generation assignment processing whereas the tone generation assignment of the second group consisting of channels CH4-CH8 is performed in accordance with the alternative assign processing (i.e., the processings of steps 69, 70, 71, 72, 73 and 74 in FIG. 10). In this processing, assignment among channels CH6-CH8 at the assignment order "3" is determined in accordance with the normal assignment processing (i.e., the processing of step 74 in FIG. 10). Tables 1e and 2e correspond to FIG. 3e.

FIG. 3f shows an example in which channels are divided into 2 groups of channels CH1 and CH2 and channels CH3-CH8. The first group consisting of channels CH1 and CH2 is set by operating the group switch GRP in the same manner as described above. The second group consisting of channels CH3-CH8 is set by grouping channels CH3-CH5 by operating the group switch GRP, also grouping channels CH6-CH8 separately by operating the group switch GRP, and executing alternative assign between the group of channels CH3-CH5 and the group of channels CH6-CH8 by operating the group switch GRP with respect to channel CH6. Channels CH3-CH5 correspond to the same assignment order "1" in the alternative assign and channels CH6-CH8 correspond to the same assignment order "2". The tone generation assignment of the first group consisting of channels CH1 and CH2 is performed in accordance with the normal tone generation assignment processing. The tone generation assignment between the group of channels CH3-CH5 and the group of channels CH6-CH8 is performed in accordance with the alternative assign processing (i.e., the processings of steps 69, 70, 71, 72, 73 and 74 in FIG. 10). Assignment to one of plural channels CH3-CH5 at the assignment order "1" is determined by the normal assignment processing (i.e., the processing of step 74 in FIG. 10). Similarly, assignment to one of plural channels CH6-CH8 at the assignment order "2" is determined by the normal assignment processing (i.e., the processing of step 74). Tables 1f and 2f correspond to FIG. 3f.

In the above described embodiment, the invention is carried out by the software processings. The invention however may be carried out by an exclusive hardware device.

In the above described embodiment, description has been made on the assumption that one channel can produce one tone. One channel however may produce plural tones such as two tones. If, for example, one channel is adapted to produce 2 tones, channels CH1'-CH8' of the same channel numbers are provided in correspondence to channels CH1-CH8. The assignment is effected with respect to channels of the respective channel numbers 1-8 in accordance with the invention and then to which of channels CH1-CH8 and CH1'-CH8' the assignment should be made with respect to each of the channel numbers 1-8 is determined in accordance with the normal tone generation assignment processing. In this case, tone forming is made by the same parameters in channels CH1-CH8 and CH1'-CH8' of the same channel number. By this arrangement, the number of tones which can be sounded simultaneously can be increased while benefit of the special tone generation assignment processing according to the invention.

Instead of employing the switch operation and processings of the above described embodiment, the grouping of channels may be made by other suitable method. The standard of grouping is not limited to the one shown in the above described embodiment (i.e., a common group is set for certain channels by operation of the group switch GRP or a common group is set for channels which become objects of the alternative assign) but other suitable standard may be employed. For example, channels may be determined to be of the same group if the same tone color number is set for them, though these channels are not designated by the group switch GRP.

In the above described embodiment, channels which are adjacent to each other are grouped into the same group but grouping may be made by freely setting numbers of desired channels to be grouped into the same group.

In the above described embodiment, the order assignment processing (i.e., the alternative assign processing) is made between channels which are adjacent to each other but the order assignment may be made by freely setting channels for which assignment is made in a desired order by the channel number.

The grouping and setting of the assignment order may be selected from among several predetermined modes instead of the manual setting by the performer.

As described above, according to the invention, the order of assignment is established with respect to desired plural channels among tone forming channels, a channel to which assignment should be made is changed and designated in the established order of assignment at each timing at which a tone should be generated, tone pitch information of the tone to be generated is assigned to the designated channel, and tone element controls which are different from one another are made with respect to the plural channels for which the order of assignment has been established. Accordingly, tone elements such as pitch, tone color and tone volume envelope of a generated tone are sequentially changed at each tone generation timing whereby a pleasant performance effect owing to the orderly change can be realized.

Further, according to the invention, tone forming channels are divided into groups consisting of one or more channels, tone pitch information of a tone to be generated is assigned group by group to the channel or channels in each of said groups, and tone element controls which are different at least between the respective groups are made. Accordingly, the tone pitch information of the tone to be generated is assigned group by group to the channel or channels within each group and, since any one or more of tone elements such as tone color, pitch and tone volume envelope formed in channels belonging to each group are different at least from those of other groups, tone signals based on the same tone pitch information are simultaneously generated in plural tones with different tone colors or tone characteristics whereby a multi-channel effect can be realized. Besides, this grouping can be made entirely freely as desired, a complicated multi-channel control such, for example, as sounding tones of a part of depressed keys only as multi-channel tones while sounding the rest of tones as a single-channel tone or differing the number of channels between tones of a part of depressed keys and the rest of tones.

What is claimed is:

1. A tone signal generation device comprising:
    tone forming channels each forming a tone signal representing a tone to be sounded of a tone pitch corresponding to assigned tone pitch information;
    assignment order setting means for setting an order of assignment with respect to plural channels among sad tone forming channels;
    assignment means for changing and designating, at each timing for generating a tone, a tone forming channel to which the tone pitch information of the tone to be sounded is to be assigned in order set by said assignment order setting means and assigning the tone pitch information to the designated channel; and
    tone element control means for supplying to said tone forming channels a tone element control signal controlling a tone element of the tone signal formed in said tone forming channels, supplying tone element control signals which are different from one another with respect at least to channels for which the order assignment is set by said assignment order setting means.

2. A tone signal generation device as defined in claim 1 wherein said assignment order setting means comprises:
    channel selection means for selecting said plural channels from among said tone forming channels;
    means for setting an assignment order of said plural channels which have been selected by this channel selection means; and
    means for storing the set assignment order.

3. A tone signal generation device as defined in claim 1 wherein said respective channels are previously assigned with an order number and said assignment order setting means comprises channel selection means for selecting said plural channels from among the entire channels, the assignment being performed in accordance with the order of said plural channels.

4. A tone signal generation device as defined in claim 1 wherein said respective channels are previously assigned with an order number and said assignment order setting means selects channels whose order numbers are adjacent to each other and establishes the assignment order in accordance with the order numbers of the selected channels.

5. A tone signal generation device as defined in claim 1 which further comprises a keyboard having keys for designating tone pitches of tones to be generated and means for generating key information representing a key depressed in said keyboard and wherein said assignment order means designates, each time key information of a newly depressed key is provided, change of a channel to which the key should be assigned.

6. A tone signal generation device comprising:
    tone forming channels each forming a tone signal representing a tone to be sounded of a tone pitch corresponding to assigned tone pitch information;
    group setting means for dividing said tone forming channels into groups each comprising one or more tone forming channels, said group setting means comprising:
        channel selection means for selecting desired channels from among said tone forming channels; and
        group designating means for designating channels as belonging to the same group, channels belonging to the same group being specified by the designation by said group designating means and the selection by said channel selection means;
    assignment means for assigning, with respect to each group set by said setting means, tone pitch information of a tone to be sounded to a tone forming channel in said group; and
    tone element control means for supplying to said tone forming channels a tone element control signal controlling the tone element control signals which are different from one another at least between groups by said group setting means.

7. A tone signal generation device comprising:
    tone forming channels each forming a tone signal of a tone pitch corresponding to assigned tone pitch information;
    group setting means for dividing the channels into groups each comprising of one or more channels;
    assignment order setting means for setting an order of assignment with respect to plural channels among said tone forming channels;

assignment means for assigning, with respect to each group set by said group setting means, tone pitch information of a tone to be generated to a channel in the group and, with respect to channels for which the assignment order has been established by said assignment order setting means, tone pitch information of a tone to be generated to channels in accordance with the established order; and tone element control means for supplying to said tone forming channels a tone element control signal controlling a tone element of the tone signal formed in said tone forming channels, supplying tone element control signals which are different from one another at least between groups set by said group setting means and supplying tone element control signals which are different from one another between at least channels for which the order of assignment is set by said assignment order setting means.

* * * * *